United States Patent [19]

Ross

[11] 4,016,564
[45] Apr. 5, 1977

[54] MULTIPLE TARGET DATA RECEIVER FOR A COLLISION AVOIDANCE SYSTEM

[75] Inventor: Walter Lee Ross, Simi Valley, Calif.

[73] Assignee: RCA Corporation, New York, N.Y.

[22] Filed: Dec. 22, 1975

[21] Appl. No.: 643,479

[30] Foreign Application Priority Data

Apr. 14, 1975 United Kingdom ............ 15221/75

[52] U.S. Cl. .......................................... 343/6.5 LC
[51] Int. Cl.² .......................................... G01S 9/56
[58] Field of Search ................................ 343/6.5 LC

[56] References Cited

UNITED STATES PATENTS

| | | | |
|---|---|---|---|
| 3,803,608 | 4/1974 | Breckman ..................... | 343/6.5 LC |
| 3,849,777 | 11/1974 | Shames et al. ................ | 343/6.5 LC |
| 3,887,916 | 6/1975 | Goyer .......................... | 343/6.5 LC |

Primary Examiner—Malcolm F. Hubler
Attorney, Agent, or Firm—Edward J. Norton; H. Christoffersen; J. D. Lazar

[57] ABSTRACT

In an interrogation vehicle, a receiver of data from a plurality of remote vehicles such as aircraft or maritime vessels in a cooperative collision avoidance system is arranged to receive such data reply signals in reply to interrogation signals. The reply signals are suitably coded in the remote vehicles to provide information in a predetermined plurality of sequential replies from each replying vehicle.

5 Claims, 3 Drawing Figures

MULTIPLE TARGET DATA RECEIVER FOR A COLLISION AVOIDANCE SYSTEM

CROSS REFERENCE TO RELATED APPLICATIONS

Of interest are the following copending Pat. applications Ser. Nos. 569,995, filed Apr. 21, 1975, entitled "Full Range Correlator for Use in a Collision Avoidance System," and Ser. No. 643,478, filed on Dec. 22, 1975, entitled "Multi-Target Tracker with Capability of Tracking Co-Range Targets," based on the invention of Walter Lee Ross; Ser. No. 462,491, filed Apr. 19, 1974, entitled "Altitude Coding for Collision Avoidance System," based on the invention of J. J. Lyon; and Ser. No. 643,481, filed on Dec. 22, 1975, entitled "Multi-Target Tracker," based on the invention of J. E. Miller, all applications having been assigned to the same assignee as the assignee of the present application.

BACKGROUND OF THE INVENTION

1. Field of the Invention

This invention relates to an interrogator carried receiver of data from remote vehicles in a cooperative collision avoidance system.

2. Description of the Prior Art

Collision avoidance systems have been proposed as means of preventing collisions by vehicles both of the maritime vessel type and of the airborne type. Cooperative systems of the asynchronous type include interrogator-transponder techniques in which interrogation signals or probes are transmitted from one vehicle on a random basis. Vehicles in the vicinity receiving such probes respond with signals of various indicia to provide to the interrogation vessel information relating to both range and information identifying the vessel and its position. In airborne systems such information may include the relative or actual altitude of the aircraft.

An existing collision avoidance system known by the acronym SECANT (Separation Control of Aircraft by NonSynchronous Techniques) employes probe types P, Q, each of which is identified by any one of a plurality of frequencies and replies using different frequencies of the same band but arranged into a predetermined correspondence to a particular probe frequency. Special correlation techniques separate the true reply to a probe from other signals which may be replies to probes generally identified as "fruit," from remote vessels. Such a system is described in U.S. Pat. Nos. 3,755,811 issued Aug. 28, 1973, and 3,803,609 issued Apr. 9, 1974, based on the inventions of Jack Breckman as well as U.S. pat. No. 3,803,604 issued Apr. 9, 1974, to Bernard Case, entitled "Digital Tracker."

In such collision avoidance systems, the ability to decode data containing information transmitted from replying aircraft is difficult to detect and process when a plurality of targets are being simultaneously tracked as potential candidates for threats of collision.

SUMMARY OF THE INVENTION

According to the present invention, a receiver suitable for use in a cooperative collision avoidance system is provided with the capability of receiving and processing data manifested by reply signals from replying vehicles. Sequential storage means such as a plurality of shift registers or RAMS each assigned during a track period to receive data corresponding to a target are selected in an order corresponding to the nearest target in sequence. The data bit from each such target is detected and decoded into binary bits corresponding to authentic data or to binary bits identifying questionable or missing data. A majority logic decoder processes the signals corresponding to the data stored in the storage means into serial format. Suitable header codes identify the start of the message for decoding the message from the data bits.

BRIEF DESCRIPTION OF A PREFERRED EMBODIMENT

Figure 1:
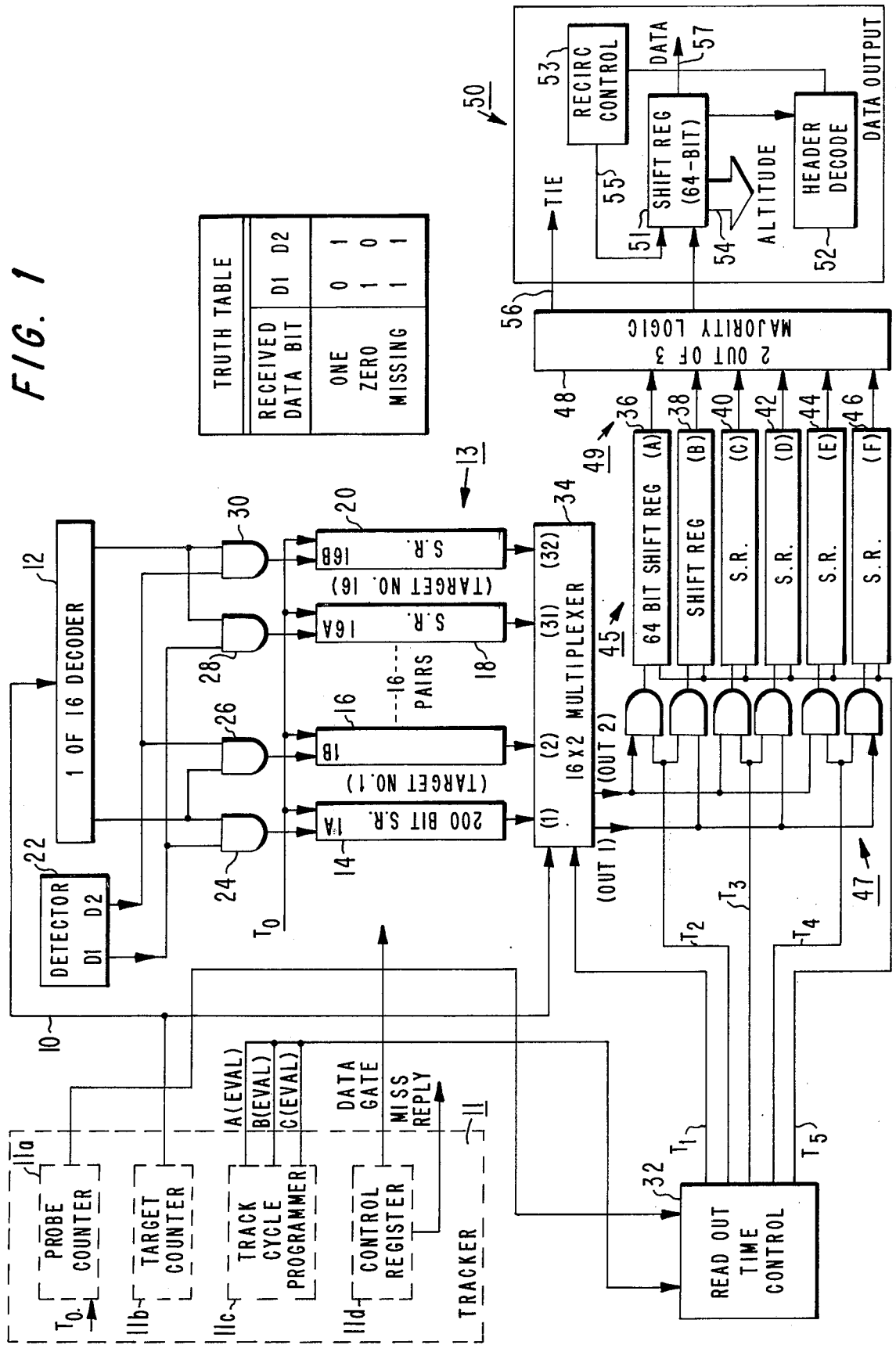
FIG. 1 is a block diagram of a data receiver embodying the present invention.

A typical collision avoidance system preferably of the SECANT type is described in the above-identified Breckman patents. A digital tracker useful in such a SECANT system is described in either of the respective above-identified copending applications of W. L. Ross and J. E. Miller. Such a system provides for a transmission of a probe from an interrogating vehicle such as an aircraft in the environment of other aircraft similarly equipped with its own transponder. Upon the receipt of each probe signal, a vehicle in the vicinity returns a reply signal to the environment. Such reply signals are received by other aircraft as well as the original or interrogating (probe transmitting) aircraft. The signals received by the interrogating aircraft are correlated in accordance with the principles discussed in the above patents and copending patent applications to identify the target aircraft that should be tracked for further information data concerning such aircraft. A threatening aircraft is identified when it has a closing range approaching a critical value time to potential collision (known as tau) with the interrogating aircraft.

The track cycle for tracking such identified aircraft is suitably divided into three periods for suitable data accumulation, and more particularly, the data concerning the range and the range rate, (i.e., the rate of closure). The circuitry for achieving such data is based on a mathematical algorithm of the type described in U.S. Pat. No. 3,893,112, entitled "Computer for Threshold of Tau" issued July 1, 1975, to J. E. Miller, or the copending application of W. L. Ross (Ser. No. 643,478).

In the operation of the data receiver in accordance with the present invention, it is assumed that the system is provided with a local timing source of clocking pulses identified as interrogation or probe pulses $T_0$ which are generated approximately once every millisecond, each such pulse being the reference for the timing system of the interrogating vehicle such as aircraft. It is further assumed that suitable equipment is provided for transmitting such interrogation pulses to the environment as probes and that such probes elicit a reply signal from vehicles such as aircraft in the environment. Such reply signals are returned and suitably received, processed, and identified as reply signals (reply videos). A suitable receiver of such reply signals is described in U.S. Pat. No. 3,848,191 issued to L. Anderson on Nov. 12, 1974. Data is provided by a predetermined sequence of replies from each such target that is being tracked. The reply signals are encoded for altitude information as described in the aforesaid copending application, Ser. No. 462,491 of J. J. Lyon. When received, the signals are collected and processed by the data receiver embodying the present invention.

A modified form of the RCA SECANT system, known as VECAS, VECAS being the acronym for the functions of a Vertical Escape in a Collision Avoidance System has the capability to determine tau for up to typically 16 targets substantially simultaneously during a track period. During this period, altitude information derived from the encoded reply signals for each of these targets is made available at the end of the track. The present receiver accumulates the data manifested by the sequence of reply signals from each of the targets being tracked and for which the tau detector of the system is computing tau and identifying threshold tau values that are critical.

Figure 2:
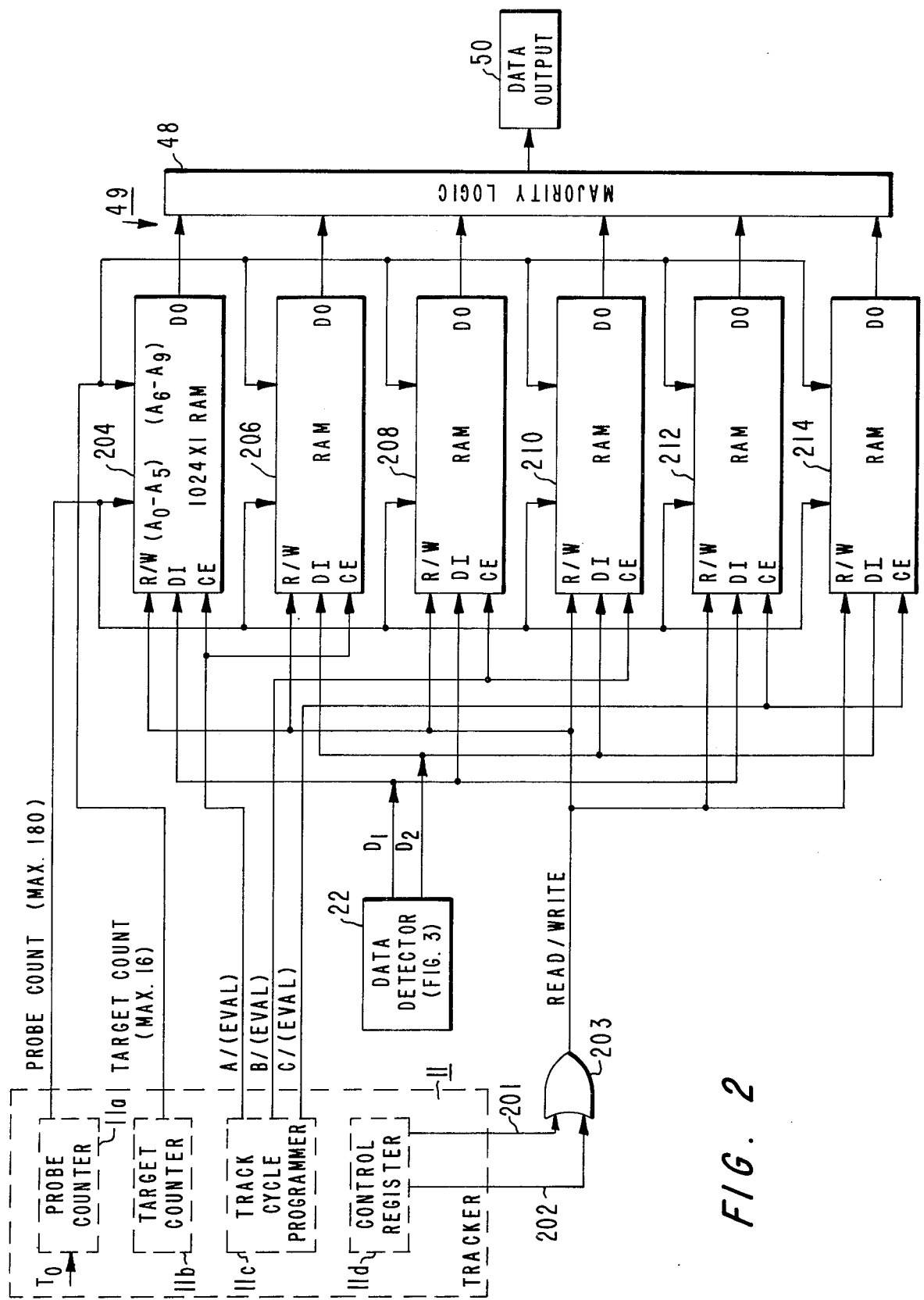
FIG. 2 is a block diagram of modified form of a data receiver embodying the present invention.

The invention may be implemented utilizing suitable sequential storage devices such as shift registers (FIG. 1) or RAMS (FIG. 2).

FIG. 1 is a block diagram of the data receiver embodied with shift registers. An array of shift registers 13 comprised of 32 shift registers forms sixteen pairs of suitably 200 by 2 shift registers (SR) 14, 16, 18, and 20. For the present system, three sets of 57 bits of data representing the altitude of replying aircraft are stored in each of the shift registers. Thus, only 171 storage positions or stages are used in each of the shift registers 13. A target counter in a multi-target tracker 11, such as described in the aforesaid copending applications, can provide an address of the target number over bus 10 to a decoder 12 for selecting a particular pair of shift registers 14–20, each pair being designated 1A–1B, 2A–2B . . . 16A–16B. For each probe ($T_0$) one reply signal encoded as a data bit is expected from each target that has been first identified by the correlator (not shown) and thereafter tracked via the multi-target tracker 11. The reply signals are encoded at the remote replying target by sufficient different frequencies to provide binary logic values for the P and Q type reply signals. In the SECANT system using the correlation signal symbols of $P^+$, $P^-$, and $Q^+$, $Q^-$ to represent binary logic values, replies are encoded in four frequencies. The received reply signal data bits are further encoded by a suitable detector 22 and entered into the shift registers 13 as two logic bits D1 and D2 in accordance with the truth table 22a shown in FIG. 1.

Figure 3:
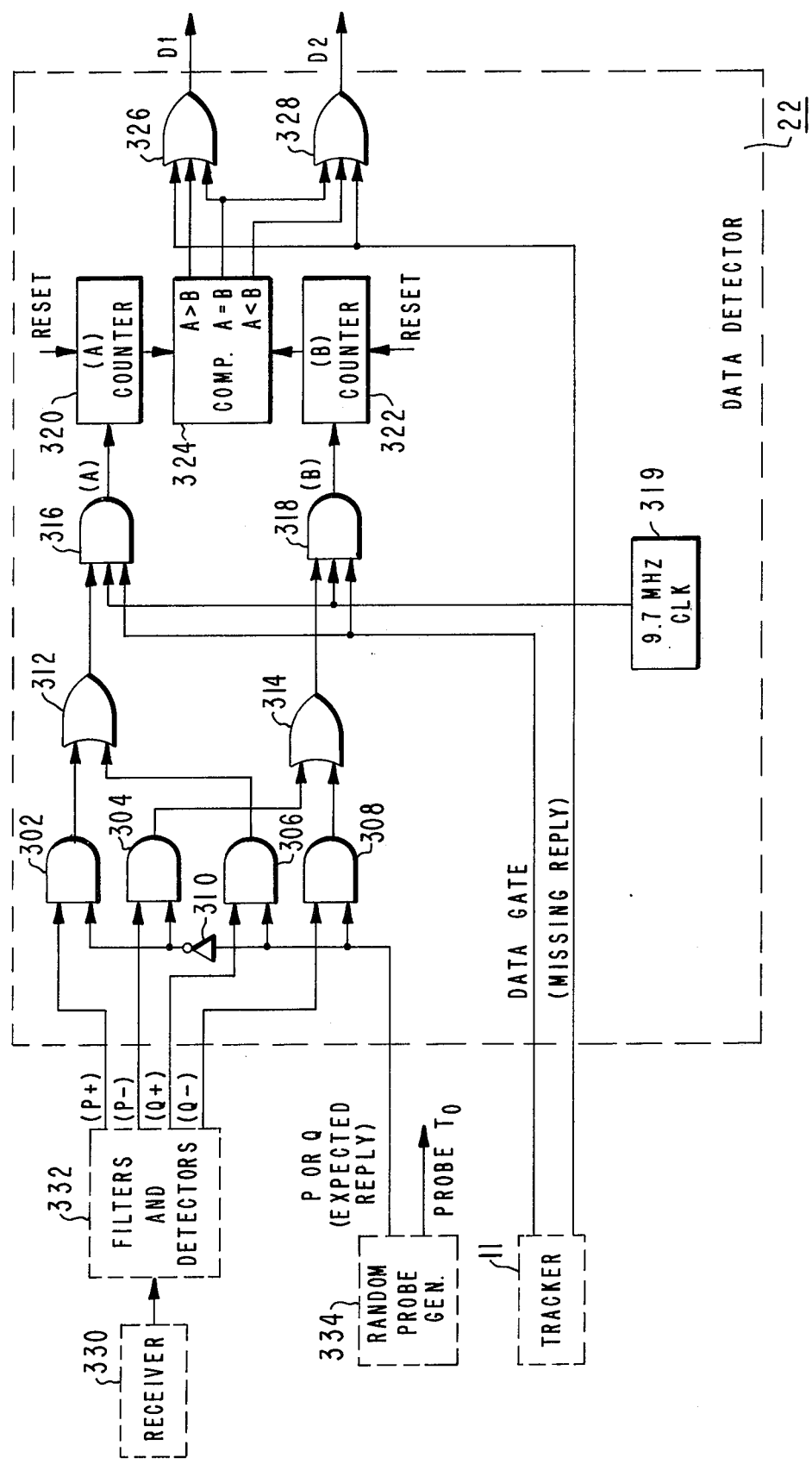
FIG. 3 is a block diagram of a preferred form of data detector for use in the receivers of FIG. 1 and 2.

A preferred form of data detector 22 for the SECANT system is shown in FIG. 3. The reply signals are received by receiver 330 and filtered and detected by a suitable filter detector 332 into suitable logic signals $P^+$, $P^-$, $Q^+$, $Q^-$ of the SECANT type. Random probe generator 334 provides a signal representing the type of signal expected for true or valid replies during each probe period as well as the probe control signal $T_0$. The signal $T_0$ and the P and Q type signals having durations of 1.0 to 1.6 microseconds are repeated at about a one kHz rate defined by the probe period. When a P-type reply is expected, a signal inhibits gates 306 and 308 and is passed through inverter 310 to enable AND gates 302 and 304, when a Q-type reply is expected. An oppositely poled signal enables AND gates 306 and 308 and inhibits gates 302 and 304. $P^+$ and $Q^+$ replies are steered through OR gate 312 to AND gate 316 while $P^-$ and $Q^-$ replies are steered through OR gate 314 to AND gate 318. AND gates 316 and 318 are clocked by the system 9.7 MHz clock 319 and are enabled by the data gate signal generated by tracker 11 as each reply signal is being tracked. The coincidence of the clock and data gate signal will pass the $P^+$ and $Q^+$ reply data signals as A signals to a counter 320 and $P^-$ and $Q^-$ reply data signals as B signals to a counter 322. Counters 320 and 322 are reset to zero after reply signal has been detected. Such a reset signal (not shown) is suitably generated by the tracker 11. This counting operation effectively is a sampling of the reply signals which have a duration in the order of 1 to 1.6 microseconds. A comparator 324 responding to the contents of the A and B counters generates logic signals on the D1 and D2 buses via OR gates 326 and 328 in accordance with the Truth Table shown in FIG. 1. Thus, reply signals that represent either logic ones or logic zeros are coded in parallel bits for further handling by the data receiver. A tie count or missing replies are considered the same, namely, a missing reply. The detector 22 functioning as a sampling circuit, integrates the sampled replies by counters A and B and weighs the result by the comparator. This circuit provides a significantly high degree of accuracy in identifying data bits of true replies and rejecting data bits that are not of true replies. Noise signals are usually less than one microsecond in duration and are thus rejected.

Further by enabling the various gates in accordance with the probing sequence, false replies are rejected.

The D1, D2 data bits are loaded into the addressed shift register via AND gates 24, 26, 28, and 30. Shift registers 13 are loaded with the data bits for subsequent evaluation in accordance with a tracking sequence programmed by a system timing generator not shown. A typical timing generator is described in the aforesaid "Multi-Target Tracket" patent application Ser. No. 643,478. In accordance with this system, three sets of 57 probes are used to both track a target as well as to derive the same altitude information included in each sequence of 57 reply signals. The probes are included in a track period comprising three periods denoted A, B, and C. Three such sets of message signals assure a high degree of reliance to decode the data into a valid message using majority logic decoding.

As each target is identified and tracked, its reply signals are detected and encoded by detector 22 (FIG. 3). Each target identified by target counter 11b, addresses decoder 12 to enable the shift register pairs (1A–1B, etc.) associated with that target to receive the D-1, D-2 bits in each stage of the shift in the sequence received. Shift registers 13 are advanced after each probe by the system probe signal $T_0$ generated by the probe generator 334 (FIG. 3). For probe periods, A, B, and C, 3 × 57, or 171 data bits or the absence of data bits will be stored in the shift register sets 1A–1B, 2A–2B, etc. for a maximum of 16 targets. The data bits are entered into the shift registers as two parallel bits coded as follows:

| Received Data Bit | SR A | SR B |
| --- | --- | --- |
| One | 0 | 1 |
| Zero | 1 | 0 |
| Missing Bit | 1 | 1 |

A 16 × 2 multiplexer 34 coupled to the last used stage (171st) of each shift register is arranged to transfer the data bits from selected pairs of registers 13 into a bank of 64-bit shift registers 45 in parallel array.

Multiplexer 34 is addressed by target counter 11b in response to an evaluation signal generated by the system timer and applied to a read out time control 32. Control 32 is arranged to provide timing signals $t_1$ to clock multiplexer 34 to transfer the data bits from the selected register pairs in accordance with the target address in bit by bit steps in the sequence stored. In addition, control 32 provides timing signals to selected pairs of AND gates 47 so that registers 36 and 38 are coupled to receive the first 57-bit message during timing period $t_2$, registers 40 and 42 during the second 57-bit message during timing period $t_3$, and registers 44 and 46 during timing period $t_4$. After the message from the selected pair of shift registers 13 is transferred to registers 45, three copies of the data message are aligned so that they can be simultaneously coupled to majority control logic 48 via bus 49. Probe counter 11a provides a count of the probe to control 32 to identify, if needed, the number of probes that have been transmitted.

Majority logic 48 is arranged by suitable logic gates to solve an algorithm for each set of six bits commonly aligned in vertical columns in registers 45 to determine the data bits received corresponding to $P^+, P^-, Q^+, Q^-$. A suitable algorithm is as follows:

$$1 = ABC + AB\overline{C} + A\overline{B}C + \overline{A}BC + ABM + AMC + MBC + AMM + BMM + CMM$$

$$0 = \overline{ABC} + \overline{A}\overline{B}C + \overline{A}B\overline{C} + A\overline{BC} + \overline{AB}M + \overline{AM}\overline{C} + M\overline{BC} + \overline{A}MM + \overline{B}MM + \overline{C}MM$$

$$TIE = AB\overline{M} + \overline{A}BM + AM\overline{C} + \overline{A}MC + MB\overline{C} + MBC + MMM$$

where A are bits from the first 57-bit message, B are bits from the second 57-bit message, C are bits from the third 57-bit message, and M are missing bits as they appear. (See Truth Table in FIG. 1).

The output message of majority logic 48 is simultaneously unloaded under control of timing signals $t_5$ into the data output 50 comprising a 64-bit shift register 51, a header decoder 52, and recirculate control 53. The header of the message when recognized by the decoder 52 provides for the altitude portion of the data to be handed off to altitude data utilization means via path 54.

In the event of TIE, that is, a calculation by majority logic 48 indicating that a decision of one out of two has been made, a "tie" signal will be generated and applied to the output 56. This indicates that no majority decision can be made manifesting an unrecoverable error in the data. This "tie" output may be used to invalidate the data and if desired initiate a new track cycle in the track equipment in a suitable manner not shown.

The operation is now briefly reviewed and summarized. Shift registers 13 are clocked by probe signal $T_0$ during the track cycle periods A, B, and C. Read out control logic 32 in response to the evaluate signal from the system timing generator via tracker 11 selects shift registers 14–20 sequentially to read out the data accumulated during the previous track cycle. At this time of evaluation, each of the shift registers 13 contain three copies of a 57-bit message from its associated target. The first copy (i.e., the first 57-bit message) of the message is transferred from SR 1A and 1B to SR 36 and 38, respectively, the second copy being transferred to SR 40 and 42 and the third copy to SRs 44 and 46. Following the transfer of the messages from the SRs 1A and 1B into the 64-bits SRs, the data in the SRs 36, 38, 40, 42, 44, and 46 are simultaneously unloaded via the majority logic circuit 48 into SR 51. Majority logic circuit 48 generates a serial data output into a 57-bit shift register 51, suitably embodied in a 64-bit type. Shift register 51 provides an output passed via path 57 to utilization means. Once the transfer of data to register 51 is made, SR 51 is rotated, i.e., its output is connected to its input by recirculate control logic 53 to find the header in the data. Decoder 52 decodes the header bits of the message encoded by the remote targets that replied and identifies the start of the information data following the header. All these data output functions take place at a 1 MHz clock rate. Once the header is found, by control 53 stopping the clocking of register 51, the altitude data is passed via bus 54 to the threat logic of the system, if a critical tau is found for this target, or to other utilization means or otherwise the data is discarded.

The target counter 11b in tracker 11 is now advanced to the next target count which selects shift registers 2A and 2B for read out in similar manner. The same procedure is followed for each target until all of the targets (maximum of 16) have been evaluated.

Reference is now made to FIG. 2 wherein a modified embodiments of a data receiver is formed of random access memories (RAM) rather than the shift registers 13 and 45 used in the embodiment of FIG. 1. Tracker 11 provides the control signals, data detector 22 provides the encoded D1 and D2 signals for storage and evaluation as previously described. Majority logic 48 coupled via bus 49 to the data output (DO) of the RAMs, evaluates the data bits in accordance with the Truth Table shown in FIG. 1. Six 1024 × 1 RAMS 204, 206, 208, 210, 212, and 214 are arranged to receive data bits D1 and D2 at the data input terminals "DI." Each RAM can store thus, a maximum of 912 bits (57 × 16) for sixteen targets. Each RAM is addressed at address terminals $A_0 - A_5$ by probe counter 11a of tracker 11 with 6 bits representing probe counts of 1 to 180 and at terminals $A_6 - A_9$ by the target counter 11b with 4 bits representing target counts of 1 to 16. RAM pairs 204 and 206 are enabled at their respective chip enable (CE) terminals during the A track period, RAM pairs 208 and 210 during the B track period, and RAM pairs 212 and 214 during the C track period. During each of the three 57-bit message track periods, the RAMS are placed in a write (W) mode to store the messages represented by the D1 and D2 data bits from detector 22. The "write" signal is generated by tracker 11 via control signal paths 201 and 202 and OR gate 203 from the control registers tracking 1 to 16 targets as each target bit generates a data gate signal. Control signals over path 201 and 202 are generated by a multi-target tracker capability of tracking two nearly co-range targets. For tracking without that capability, only a single read/write control lead would be needed. The D1 and D2 bits are thus stored in the RAM location corresponding to the target and probe count address. In the absence of a write signals, the RAMS are placed in a "read" (R) mode whereby the contents of the RAM are passed via the output terminals (DO) and bus 49 to majority logic 48 for evaluation if enabled at terminal CE. The decoded data bits are passed to the data output 50 for altitude decoding in response to the evaluate (EVAL) signal from the programmer 116, as previously described.

What is claimed is:

1. In combination, means for receiving reply signals generated by remote stations in response to probe signals from interrogating stations, said reply signals being adapted to be received in an environment wherein signals of a type different from said reply signals may be received, all of said received signals being of predetermined duration and having a characteristic indicia of either a binary logic value of one or zero, means for detecting said received signals and generating therefrom digital signals representing a binary bit corresponding to said logic value, means for sampling said digital signals and generating therefrom a plurality of sampled signals, each sampled signal having a duration substantially less than said predetermined duration, and means for comparing the relative duration of sampled signals of one logic value with that of sampled signals of the opposite value to generate a multi-bit digital output signal manifesting a first or second binary logic value, which corresponds to that of a valid received reply signal, in accordance with the longer of said compared sampled signals or manifesting a third binary logic value, which corresponds to the absence of a valid received reply signal, when the duration of said compared sampled signals is equal.

2. The combination of claim 1 including means responsive to said digital output signal for encoding a pair of coded digital bits to represent either a binary logic bit or the absence of a binary logic bit.

3. The combination of claim 2 wherein a plurality of said signals in predetermined sequence define a logic word, and further, includes:

storage means to store a plurality of said coded digital bit pairs corresponding to at least three of said logic words, majority logic means coupled to said storage means so that a majority vote output signal is generated by comparing corresponding bit pairs of each of said logic words, means for transferring said stored coded bit pairs into said majority logic means to generate said majority vote output signal for each of the corresponding bit pairs in a sequence corresponding to said word.

4. The combination of claim 3 wherein storage means comprises shift registers.

5. The combination of claim 3 wherein storage means comprises random accesss memories (RAMS).

* * * * *